March 29, 1960     E. SCHAUFUSS     2,930,958
REGULATING DEVICE WITH AUXILIARY CONTROL CIRCUIT
Filed Oct. 21, 1957
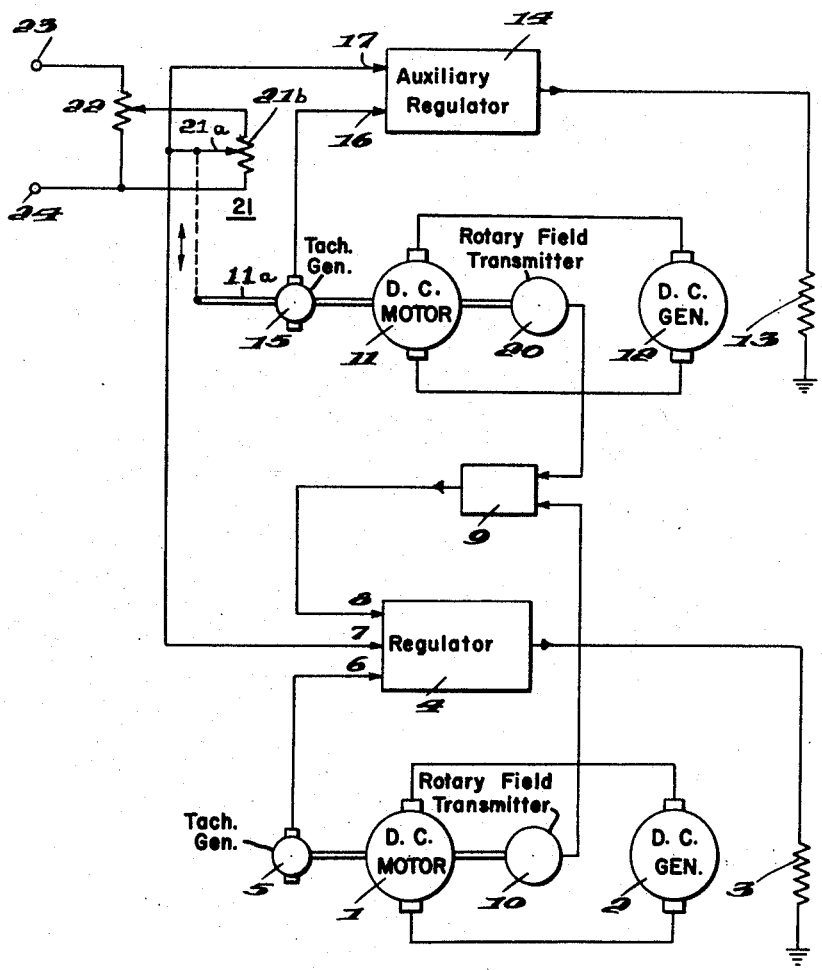
INVENTOR
*Erich Schaufuss*
BY *Pierce, Scheffler & Parker*
ATTORNEYS

United States Patent Office 2,930,958
Patented Mar. 29, 1960

2,930,958

REGULATING DEVICE WITH AUXILIARY CONTROL CIRCUIT

Erich Schaufuss, Mannheim, Germany, assignor to Brown, Boveri & Cie Aktiengesellschaft, Mannheim, Germany, a joint-stock company Application October 21, 1957, Serial No. 691,506

Claims priority, application Germany October 24, 1956

6 Claims. (Cl. 318—70)

The present invention relates to regulating systems and more particularly to such a system wherein a quantity to be regulated is controlled in accordance with the instantaneous difference between its actual value or amplitude and a theoretical value or amplitude which is desired to be observed or followed. The actual and theoretical values or amplitudes are constantly compared and the deviation therebetween is used in such manner as will change the quantity by such amount that the deviation will be eliminated, or at least reduced to a practical minimum, thus stabilizing the quantity at substantially the theoretical value or amplitude that it is desired to maintain.

With complicated regulating systems or when several control circuits are coupled to each other it is frequently difficult to obtain the necessary stability and accuracy. These difficulties appear particularly in those regulating systems, usually called duplicating systems, where the predetermined theoretical value does not remain constant but rather is changed or varied continuously during the operation, and where the corresponding change in the regulated quantity must follow the variations in the theoretical value in an accurate and rapid manner in spite of the presence of interfering factors which tend to create errors in the system.

According to the present invention, as will be more particularly detailed in the following description of one practical application thereof, the regulating system includes an auxiliary control circuit which is a duplicate or copy of the main control circuit as far as the control elements are concerned, but which is not subject to the interference factors that affect the main control circuit and wherein means are provided with which the difference between the actual values of the regulating quantities of the main and auxiliary control circuits are fed additionally to the regulator of the main control circuit as corrective quantities and in such sense as will reduce the differences.

The invention is applicable, for example, to the regulation of the speed of a motor which is to be controlled in accordance with, i.e. it is to follow, a theoretical variable speed pattern and which is illustrated in the accompanying schematic electrical circuit diagram. According to this embodiment, a motor to which a load is applied is arranged to run with an angular velocity, i.e. speed, which shall vary periodically about a mean value. Both the mean value of the angular velocity and the amount by which it is periodically varied, as well as the chronological course of the variations, are also adjustable at will within certain limits.

With reference now to the drawing, it will be seen that the main control circuit includes a direct current motor 1 which is to be controlled in such a manner that its speed varies periodically about a mean value so that the load driven thereby, such as for example a flying saw, not shown, will likewise vary in speed about the same mean value. The electrical power for driving motor 1 is furnished by a direct current generator 2 to which it is electrically connected according to the well known Ward-Leonard system. The motor for driving generator 2 at a constant speed has not been illustrated since it is not essential to an understanding of the present invention. The field excitation 3 for generator 2 is supplied from a regulator 4 of known construction and hence, in the interest of simplification, has not been shown in circuit detail.

In addition to the main load driven by motor 1, the latter also drives a small tachometer generator 5 whose output voltage varies in accordance with, i.e. it is proportional to, the speed of motor 1. Consequently, the voltage output from generator 5 serves as a device for transmitting the actual speed of motor 1 and is applied at 6 to regulator 4 as a regulating input quantity.

The theoretical value transmitter for motor speed is, in the present embodiment, constituted by a varying voltage taken off from potentiometer 21 and is also applied to regulator 4 as a second regulating input quantity. The position of slide arm 21a of potentiometer 21 is varied along the potentiometer resistance 21b in accordance with the operation of the auxiliary control circuit in a manner to be more particularly explained, and hence produces a corresponding varying output voltage which is applied to the input 7 of regulator 4. The voltage applied across the terminal ends of resistance 21b is shown as being derived from a second potentiometer 22 which is connected to a voltage source applied between terminals 23 and 24. The output voltage of potentiometer 22 can be adjusted but is not varied during operation of the system.

Operation of regulator 4 is such that the instantaneous difference between the tachometer voltage from generator 5 and the varied voltage from potentiometer 21 is constantly applied to regulator 4 and its output voltage, which reflects such difference, is applied to the generator field 3 thus strengthening and weakening it in a periodic, i.e. cyclic manner. The effect of the variation in field strength of generator 2 is reflected by a corresponding cyclic increase and decrease of the voltage output from generator 2 and which is applied to the armature of motor 1, which has a constant field strength, to thus effect a corresponding cyclic increase and decrease of the speed of motor 1, and hence of the load which it drives, in the desired periodic pattern of variation about a mean value.

In order to improve the regulation effected by the components of the main system as explained above, the present invention compounds the basic regulation with an auxiliary control circuit which is a copy or duplicate of the main control circuit as far as control conditions are concerned but differs in that the motor element corresponding to the main load driving motor 1 carries no appreciable load except that represented by the relatively small loads which it drives. Consequently, the direct current motor 11 and generator 12 of the auxiliary circuit connected in Ward-Leonard arrangement are relatively small machines of small power characteristics such as, for example, a few hundred watts.

Generator 12 of the auxiliary system is driven at a constant speed by a motor device, not illustrated, and its field winding 13 is controlled as to excitation by the voltage output of an auxiliary regulator 14 which is a copy, at a smaller power scale, of the main regulator 4. As indicated, the load on auxiliary motor 11 is not of any consequence and consists of a tachometer generator 15 which it drives and possibly also a rotary field transmitter 20 also driven by it and which can be used to further improve the regulating effect of the system. The voltage output from tachometer generator 15, which is thus a measure of the speed of auxiliary motor 11, is applied at 16 as a control input to regulator 14, and the output voltage from potentiometer 21 is likewise applied at 17 as a second control input to regulator 14. As with regulator 4, the instantaneous difference between the control input voltages at 16 and 17 is reflected correspondingly in the output voltage applied to the field 13 of auxiliary generator 12 and results in a corresponding change in the speed of auxiliary motor 11.

The theoretical value transmitter for the speed, that is the periodic variation thereof about a mean value, can be controlled in any desired manner such as, for example, by a special driving motor or by a leading quantity which is determined for the desired chronological course of the speed variation. In the illustrated embodiment, the slide arm 21a of potentiometer 21 is coupled to the shafting 11a of auxiliary motor 11 in such manner that it performs one complete cycle of a back-and-forth motion along the potentiometer resistance element 21b for each revolution of the motor shafting 11a. Thus for each angular position of the motor shafting 11a there results a certain theoretical value of angular velocity which is correspondingly reflected in the output voltage from potentiometer 21. Since auxiliary motor 11 is not subject to load variations, as distinguished from the variations in load associated with the main load-driving motor 1, nor any other interfering influence, the angular velocity or speed of auxiliary motor 11 follows, in a very faithful and accurate manner, the variations in the theoretical value. Thus each angular position of auxiliary motor 11 is associated with great accuracy with a certain actual angular velocity.

As previously explained, the theoretical value of the angular velocity from potentiometer 21 is fed to regulator 4 and hence the speed of motor 1 will thus change periodically in the same manner as that of motor 11.

The amplitude of the variations of the angular velocity can be adjusted if desired by changing the length of the stroke of the slide arm 21a on potentiometer 21. Likewise, the chronological course of the variations within each cycle can be determined by a corresponding gradation of the potentiometer resistance 21b or by the selection of the functional dependence of the position of the slide arm 21a on its respective angular position of the auxiliary motor 11, for example by means of a cam disc.

It is also possible to achieve, for example, by the interposition of a transmission gear, that a cycle of the speed variation corresponds not to a single but rather to any one of a number of revolutions of the auxiliary motor 11; in any case, however, so that it is in a fixed ratio to the number of revolutions of the motor.

The device for varying the theoretical value for the angular velocity can be designed in a different way. If a mechanical regulator is used whose theoretical value is given, for example, by the tension of a spring, the spring tension can be changed continuously, for example, by means of corresponding mechanical devices. The mean value of angular velocity of auxiliary motor 11 and thus the duration of the cycle of its variations is determined by the mean value of the given theoretical value. In the embodiment illustrated it is adjusted by potentiometer 22.

Because of the fact that the main circuit, i.e. motor 1, is subject to factors of unfavorable influence, such as a change in load on this motor, it is possible that differences may arise in the chronological course of the speed variations of the motors 1 and 11. In order to reduce to a minimum such control deviations of the main control circuit as may occur, the respective differences of the angular velocities of motors 1 and 11 as may arise are used, according to the invention, for the formation of a corrective quantity which is fed to main regulator 4 and which it influences in the sense as to reduce such deviation. To this end, the two motors 1 and 11 can each be coupled with an additional tachometer generator, the respective output voltages being in opposition, the voltage difference thus formed serving as a corrective quantity.

It is even more effective to use, as a corrective quantity for the main control circuit, not the speed difference itself, but rather the time integral thereof, that is, the deviations of the angular positions of both motors from each other. In order to achieve this, the motors 1 and 11 in the illustrated embodiment are arranged to drive rotary field transmitters 10 and 20, respectively. The voltages of these rotary field transmitters, consisting for example, of single-phase synchronous generators excited by rotary current, are fed to a phase-sensitive discriminator 9 of known construction. As long as the angular positions of the two motors 1 and 11 are exactly the same, there is no voltage at the outlet of the phase-sensitive discriminator. However, as soon as the angular positions of the two motors differ from each other, a direct voltage is produced in the phase-sensitive discriminator, the polarity of which depends on which of the two motors leads the other in angular position. This voltage is introduced into the regulator 4 at input terminal 8 and additionally influences its output voltage in such sense as will eliminate the angular deviation. In this way, it is possible to conform the angular velocity of motor 1 very accurately to that of motor 11, which means that the influence of interfering factors on the angular velocity of the motor 1 is practically completely eliminated.

The embodiment of the invention as described can be used, for example, for driving a so-called "flying saw" where the circular saw, guided with irregular speed on a circular track and rotating in a plane perpendicular to the plane of the circular track, cuts in the lower part of its track the rolled material (tubes, sections, etc.) issuing continuously from a rolling mill. The motion of the saw must be so controlled that it has on the one hand, during the sawing operation, a velocity component in the direction of motion of the rolled material which coincides with the velocity of the rolled material, while the entire running time of the saw on the circular track has to be so regulated that the severed pieces have a predetermined length. It can be seen that these conditions can be met if the angular velocity of the motor is varied according to the invention for the drive of the circular track guide of the motor. However, the invention is not limited to the above-described example, neither in its design nor in its application.

Thus, it is possible, for example, to use other known means for measuring the speed, such as centrifugal pendulums, etc., which make their measuring values mechanically or electrically usable, for example, by adjusting a potentiometer as a theoretical value indication.

In order to determine the angular deviations, stroboscopic measuring devices can be used instead of the above-mentioned rotary field transmitters, in conjunction with scanning of the measuring values (represented as light effects) by photoelectric cells.

The main drive and its copy can also be fed, instead of by control generators 2 and 12 in Ward-Leonard connection, by any other controllable current sources, for example, by converters.

If the control is to be extended over a wide speed range, it may be advisable to couple the rotary field transmitters 10 and 20 or one of them with the corresponding motors over gears with different reversible transmission ratios.

The invention can also be used in other regulating operations, namely wherever it is important for a regulating quantity to follow a theoretical value very accurately and rapidly, uninfluenced by interference factors.

As another example for the application of the invention it is desired to mention duplicating milling machines or duplicating lathes, where the motion of the cutting tool must be so controlled that it follows accurately the motions of a scanning device guided on a model.

I claim:

1. In a regulating system, the combination comprising a main control circuit including a member producing an actual main quantity to be regulated in value, means producing a first control quantity proportional to the actual value of said main quantity, means producing a second control quantity representative of a continuously varying theoretical value as to which it is desired that the value of said main quantity shall conform, a main regulator having inputs constituted respectively by said first and second control quantities, an output applied to said main quantity for varying the value thereof, said output of said main regulator being determined in accordance with the difference between said first and second control quantities; an auxiliary control circuit which is essentially a duplicate of said main control circuit as to elements thereof but which is not subject to interference factors affecting said main control circuit; means comparing the actual value of said main quantity of said main control circuit with the corresponding quantity of said auxiliary control circuit to obtain their difference, said difference being applied as a further input to said main regulator of said main control circuit to further control the output thereof in such sense as to reduce such difference towards zero.

2. A regulating system as defined in claim 1 wherein said comparing means operates to produce a difference value proportional to the time integral of such difference.

3. A regulating system as defined in claim 1 wherein said main quantity to be regulated in value is the angular velocity of a rotating shaft and wherein said comparing means operates to produce a difference value proportional to the time integral of such difference.

4. A regulating system as defined in claim 3 wherein said comparing means is comprised of rotary field transmitters driven respectively by the rotating shafts of said main and auxiliary control circuits and a phase sensitive discriminator having its input constituted by the outputs of said rotary field transmitters, the output of said discriminator being a voltage of positive or negative polarity in accordance with the sense of such difference, and said voltage being applied to said main regulator of said main control circuit.

5. A regulating system as defined in claim 1 wherein said main quantity to be regulated in value is the angular velocity of a rotating shaft and wherein said comparing means operates to produce a difference value proportional to the time integral of such difference, and which further includes means actuated by the rotating shaft of said auxiliary control circuit for producing said second control quantity representative of said continuously varying theoretical value.

6. A regulating system as defined in claim 1 wherein said main quantities of said main and auxiliary control circuits are constituted by direct current motors supplied by direct current generators, said motor and generator of each circuit being arranged in Ward-Leonard connection, said means producing said first control quantities of said main and auxiliary control circuits being tachometer generators driven by the motors of said main and auxiliary control circuits, said means producing said second control quantity representative of a continuously varying theoretical value being a continuously varying potentiometer and said regulators of said main and auxiliary control ciruits producing voltages which are applied to the field circuits of the respective generators and which voltages are regulated in amplitude by the joint action of the voltage outputs of said tachometer generators and potentiometer.

References Cited in the file of this patent

UNITED STATES PATENTS

| | | |
|---|---|---|
| 2,385,204 | Hanna | Sept. 18, 1945 |
| 2,634,387 | Mercier | Apr. 7, 1953 |